United States Patent
Deen et al.

(10) Patent No.: US 9,794,269 B2
(45) Date of Patent: Oct. 17, 2017

(54) METHOD AND SYSTEM FOR VALIDATING RIGHTS TO DIGITAL CONTENT USING A DIGITAL TOKEN

(71) Applicant: NBCUniversal Media, LLC, New York, NY (US)

(72) Inventors: Robert Glenn Deen, Simi Valley, CA (US); Michael Shane Wilkinson, Newhall, CA (US)

(73) Assignee: NBCUniversal Media, LLC, New York, NY (US)

( * ) Notice: Subject to any disclaimer, the term of this patent is extended or adjusted under 35 U.S.C. 154(b) by 370 days.

(21) Appl. No.: 14/013,969

(22) Filed: Aug. 29, 2013

(65) Prior Publication Data

US 2015/0067341 A1    Mar. 5, 2015

(51) Int. Cl.
  *G06F 7/00* (2006.01)
  *G06F 17/30* (2006.01)
  *H04L 29/06* (2006.01)

(52) U.S. Cl.
  CPC ............ *H04L 63/123* (2013.01); *H04L 63/10* (2013.01); *H04L 2463/102* (2013.01)

(58) Field of Classification Search
  CPC ........... H04L 63/0861; H04L 2463/102; H04L 63/123; H04L 63/10

USPC ................. 707/781, 782, 784, 796
See application file for complete search history.

(56) References Cited

U.S. PATENT DOCUMENTS

| | | | |
|---|---|---|---|
| 6,996,546 B1* | 2/2006 | Giles | G06Q 10/00 380/277 |
| 2007/0124796 A1* | 5/2007 | Wittkotter | H04N 7/17309 725/136 |
| 2008/0040807 A1* | 2/2008 | Lu | H04N 21/2541 726/26 |
| 2010/0287196 A1* | 11/2010 | Shields et al. | 707/769 |
| 2014/0055824 A1* | 2/2014 | Tremolada et al. | 358/3.28 |

* cited by examiner

*Primary Examiner* — Md I Uddin (57) ABSTRACT

A computer implemented method for generating a receipt. The method includes, accessing a universal digital fingerprint associated with an item of content, wherein the fingerprint is invariant across one or more formats of the item of content. The method includes accessing an identification value by the processor. The method includes generating a digital token by cryptographically binding the digital fingerprint and the identification value, wherein the digital token is invariant across the one or more formats of the item of content. The method further includes associating the digital token with at least one right to the item of content.

12 Claims, 6 Drawing Sheets

METHOD AND SYSTEM FOR VALIDATING RIGHTS TO DIGITAL CONTENT USING A DIGITAL TOKEN

BACKGROUND

With the advent of digital formatting, it is possible to distribute multimedia content (e.g., video, audio, etc.) through many avenues. For example, after a movie production makes its run through the theaters, additional distribution channels include independent cable and satellite networks, through disk (e.g., DVD [digital versatile disk], CD [compact disk], etc.), and through internet streaming to name a few. In that manner, a customer may purchase a copy of the digital content for personal use. That use may include rights to use the digital content one time or multiple times.

An association of an customer's rights to digital content previously involved a third party certification service. For example, when a customer purchased digital content, that customer may be given a certificate that is authorized by a third party. As such, to prove that they had rights associated with the digital content, the customer would present the certificate, which would then be delivered to the third party for authorization. In another example, a new offer for additional merchandise related to the movie may be made to existing customers. In that case, a customer interested in the offer is able to prove ownership by presenting the certificate. Once the certificate is verified, the offer is presented to the customer.

However, this process is burdensome because it involves an independent third party. That is, verification of the certificate must be performed by the third party authentication service. This involves sending the certificate through a communication network, having the certificate processed by the third party, and then waiting for the results of the verification to be returned.

Moreover, when that third party authentication service goes out of business, verification of those certificates is compromised. Frequently, no transfer of certificates is made to another authentication service once the original service is out of business. As such, even if a customer holds a certificate showing rights to digital content, there is no process for verifying the validity of that certificate. In that case, the customer could not prove rights to the digital content, and may not be able to take advantage of additional promotions related to the digital content.

It is desirous to prove one or more rights to digital content without using a third party authentication service.

SUMMARY

In embodiments of the present invention, a computer implemented method for generating a receipt is described. The method includes accessing a universal digital fingerprint associated with an item of content. The digital fingerprint is universal in that it is invariant across one or more formats of the item of content. The method includes accessing an identification value by the processor, wherein the identification value is used to identify a right to an item of content. The method includes generating a digital token by cryptographically binding the digital fingerprint and the identification value. The digital token is invariant across the one or more formats of the item of content. The method includes associating the digital token with at least one right to the item of content. As such, presentation and verification of the digital token also verifies the at least one right to the item of content.

In another embodiment of the present invention, a method for validation is described. The method includes accessing a digital token associated with an item of content. The digital token is invariant across one or more formats of the item of content. Further, the digital token is based on a universal digital fingerprint of the item of content, wherein the digital fingerprint is invariant across one or more formats of the item of content. Also, the digital token is based on a first identification value used in a transaction purchasing at least one right in the item of content. The method includes accessing a validation identification value presented for validation of the digital token. The method also includes accessing a version of the universal digital fingerprint. The method includes cryptographically binding the version of the digital fingerprint and the validation identification value to generate a validation token. The method includes comparing the validation token against the digital token for purposes of validating at least one right in the item of content.

In some embodiments, a non-transitory computer-readable storage medium is disclosed having stored thereon, computer-executable instructions that, when executed causes the computer system to perform a method for generating a receipt. The method includes accessing a universal digital fingerprint associated with an item of content. The digital fingerprint is universal in that it is invariant across one or more formats of the item of content. The method includes accessing an identification value by the processor, wherein the identification value is used to identify a right to an item of content. The method includes generating a digital token by cryptographically binding the digital fingerprint and the identification value. The digital token is invariant across the one or more formats of the item of content. The method includes associating the digital token with at least one right to the item of content. As such, presentation and verification of the digital token also verifies the at least one right to the item of content.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other cases, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "binding," "cryptographically binding," "generating," "associating," "performing," "accessing," "comparing," "receiving," or the like, refer to actions and processes (e.g., flowcharts 300 and 500 of FIGS. 3 and 5, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
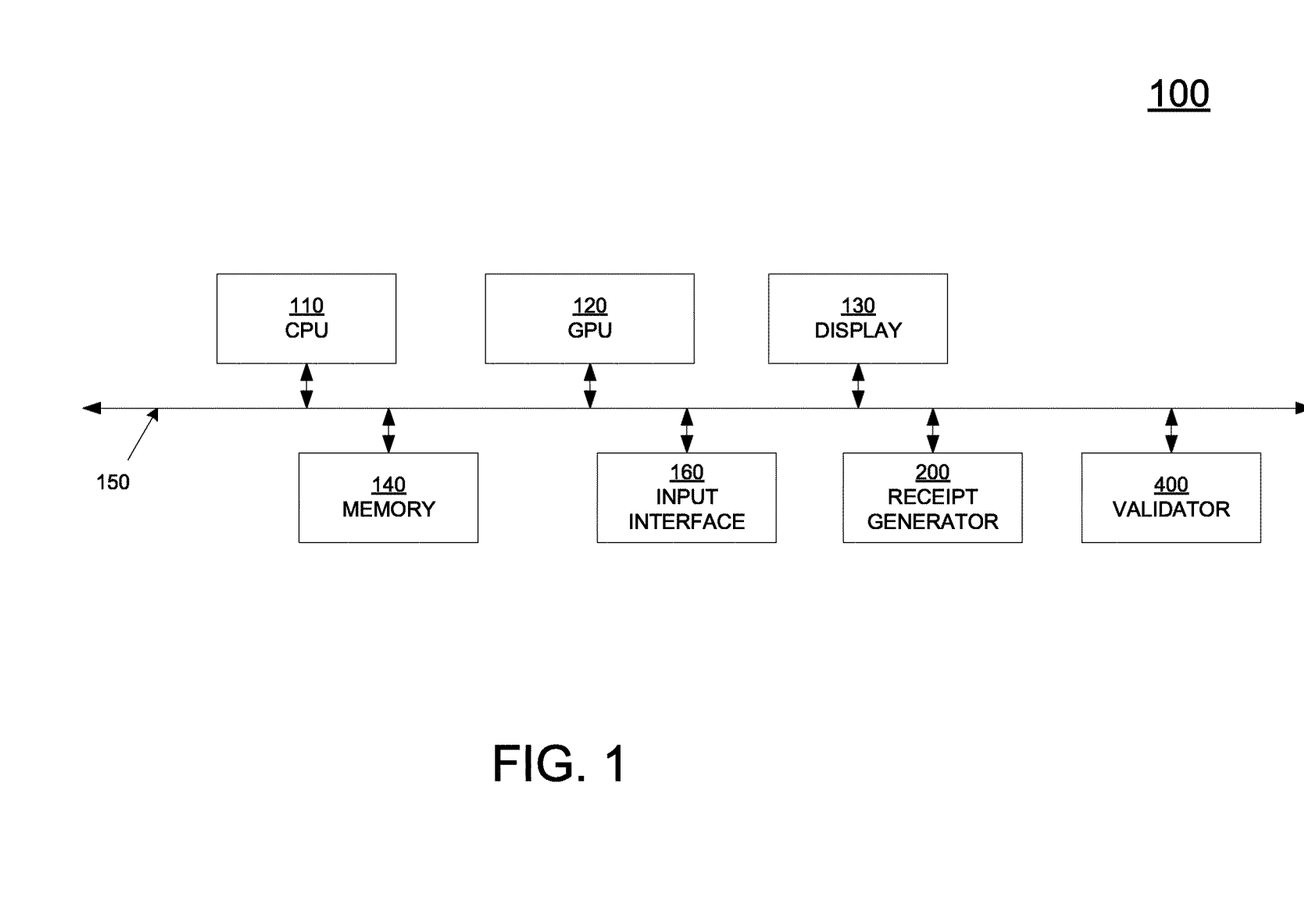
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

The system 100 includes a receipt generator 200 that is configured for generating a digital token that is associated with one or more rights to an item of digital content. As such, the digital token may be presented to show that at least one right. In addition, the system 200 includes a validator 400 that is configured to validate or authenticate a digital token, wherein the digital token is associated with one or more rights to an item of digital content. In that manner, once the digital token is presented and validated, the one or more rights to the item of digital content is also validated.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Digital Token Generation and Validation

Accordingly, embodiments of the present invention provide for a way to verify or prove to a supplier of digital content or any other interested party that a customer has previously purchased or was given rights to that digital content without the use of a third party authentication/verification/validation service. In addition, other embodiments provide the above accomplishments and further provide for the generation of a digital token that is associated with and based on an item of digital content that is independent of the formatting (e.g., digital encoding, video resolution, etc.) of that item. Further, still other embodiments provide the above accomplishments and also provide a method for validating rights to an item of digital content that does not require persist storage, thereby avoiding for example, storage of issued certificates, keys, or tracking databases.

Embodiments of the present invention are described within the context of digital content. That content is generalized to include any type of content, such as, video, audio, data, text, text-only, static images, animation, multi-media, or the like.

Figure 2:
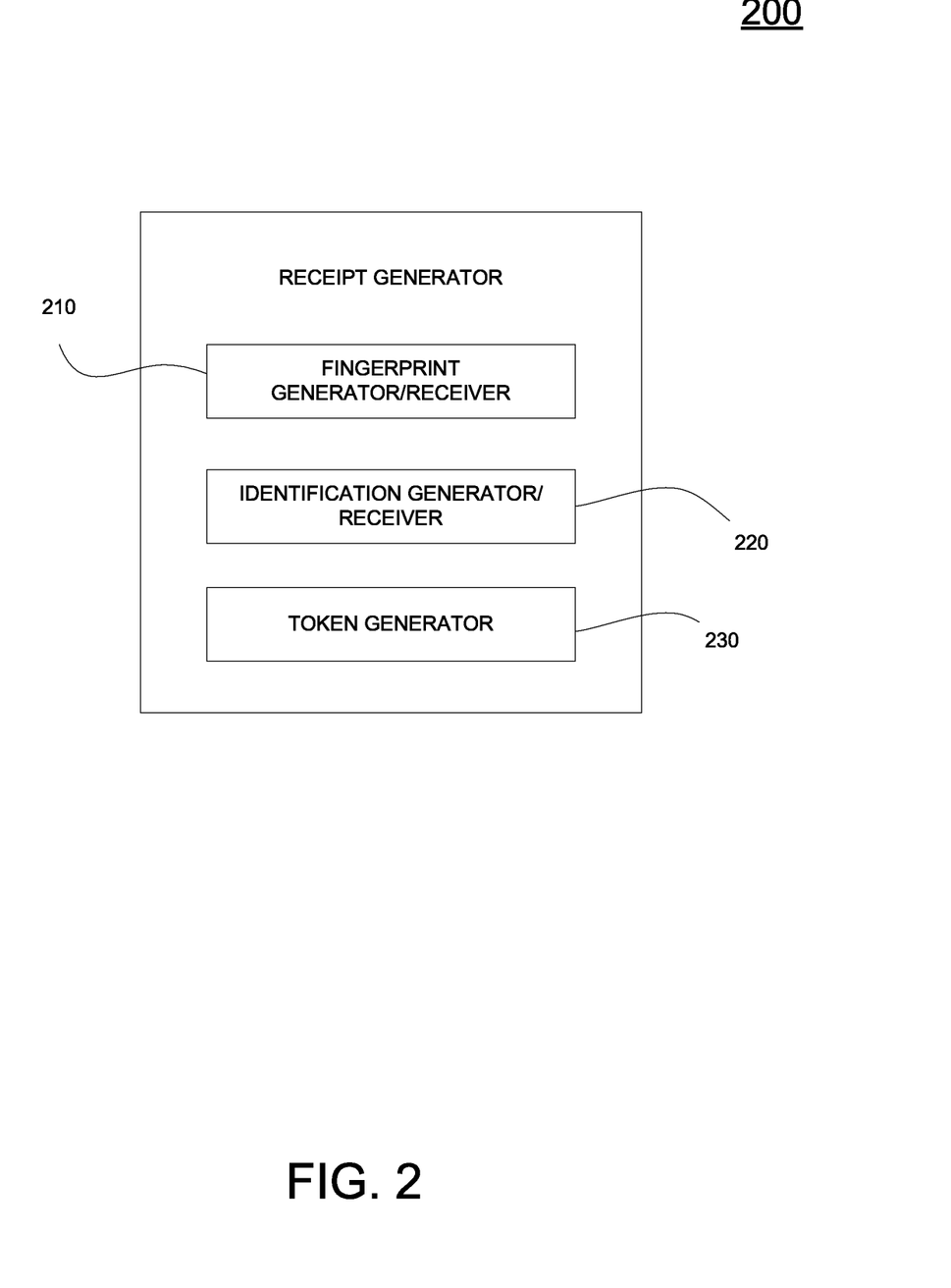
FIG. 2 is a block diagram of a receipt generator configured to generate a digital token associated with at least one right to an item of digital content based on a universal digital fingerprint of the item and an identifier, in accordance with one embodiment of the present disclosure.
Figure 3:
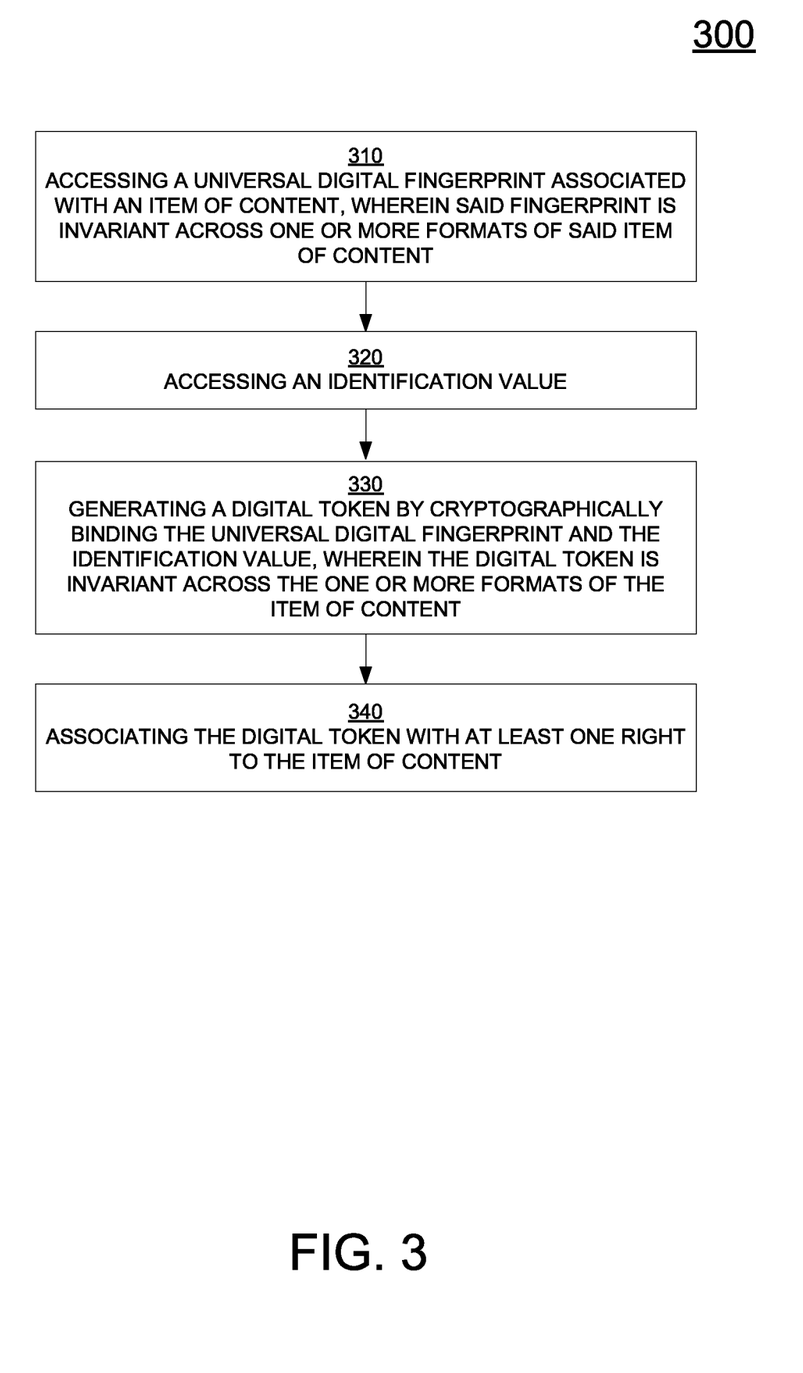
FIG. 3 is a flow diagram illustrating a method for generating a receipt showing an association between the holder of the receipt and at least one right to an item of digital content, in accordance with one embodiment of the present disclosure.

FIGS. 2 and 3 combined illustrate a system and method for generating a receipt that is associated with at least one right to an item of digital content. For example, the right shows that the item was involved in a transaction (e.g., purchase of the item), and shows ownership to those rights. As an example, the receipt shows that a customer purchased a copy of a movie, and can be presented to obtain additional rights to that movie, such as, merchandise, streaming of the movie, additional copies of the movie, an upgrade to that movie, purchase deals involving other products and/or services, etc.

In particular, FIG. 2 is a block diagram of a receipt generator 200 configured to generate a digital token associated with at least one right to an item of digital content based on a universal digital fingerprint of the item and an identifier, in accordance with one embodiment of the present disclosure. For example, the item of digital content includes an instance of the item, such as, a copy of the digital content (e.g., a copy of a movie). In other examples, the item of digital content includes one or more instances of the content, such that a right is generally applied to the item of digital content and not necessarily to one instance (e.g., a copy), of the digital content. In general, the receipt generator is configured to generate a receipt in the form of a digital token, wherein the digital token is associated with one or more rights to an item of digital content. As previously described, the digital token as a receipt may show that a purchaser purchased a copy of the item of digital content (e.g., a DVD copy of a movie).

As shown in FIG. 2, a fingerprint generator/receiver 210 is configured to generate a digital fingerprint that is associated with an item of digital content, and is based on that item of digital content. Moreover, the digital fingerprint is universal, in that it is invariant across different formats of the item of digital content. For example, the digital fingerprint that is generated would be the same no matter which version or formatting of the item of digital content is used. As a further example, an item of digital content may be a movie, Movie X, and that movie may exist in different formats or versions, such as, encoding formats (e.g., MPEG2 [moving pictures experts group version 2], MPEG4, AVI [audio video interleave], QuickTime, etc.), or video resolutions (e.g., standard definition [SD], high definition [HD], 4K referring to 4,000 horizontal pixels, etc.).

In another case, the fingerprint generator/receiver 210 is configured to access and/or receive a digital fingerprint that is associated with an item of digital content. Because the digital fingerprint is invariant across multiple versions or formatting, a previously generated digital fingerprint is suitable for use, in one case. As such, the fingerprint generator/receiver 210 is configured to receive a previously generated digital fingerprint, that is generated by the generator 210 and stored, or generated by another generator. In another case, the fingerprint generator/receiver 210 newly generates the digital fingerprint based on the underlying digital content.

The receipt generator 200 also includes an identification generator/receiver 220. In one case, the identification generator/receiver 220 generates a unique identifier. That unique identifier is used for identifying one or more related elements. For example, the identifier may uniquely identify a customer or purchaser of an instance (e.g., copy) of the item of digital content. The identifier may identify a transaction that involves a customer purchasing an instance of the item of digital content.

In one implementation, the identifier generator/receiver 220 is configured to receive information that is used as or to derive the unique identifier. For example, the information is provided by a purchaser at a time that he or she is purchasing an instance (e.g., copy) of an item of digital content. As an example, the information may include an alpha-numeric user password or user name. That information (e.g., user password) may be used directly as the unique identifier. In another case, the information is used to derive the unique identifier. For instance, the information may be a mobile phone number that is thereafter cryptographically transformed to a unique identifier. As long as the same cryptographic transformation is used along with the phone number, then the unique identifier is reproducible. As such, the customer need only remember the phone number.

In another implementation, the identifier generator/receiver 220 is configured to generate the unique identifier. For example, in a transaction involving the purchase of an instance of an item of digital content (e.g., a copy of a movie), the seller may generate a unique identifier that is associated with the transaction using the receipt generator 200. In one case, the seller may generate the unique identifier independent of any information provided by the purchaser. That is the unique identifier is newly generated and has no direct association with the purchaser outside of the transaction. For example, the unique identifier may be a random number, such as a transaction identifier. In another case, the unique identifier includes a combination of information from the purchaser as well as other information, such as, from the seller. That is, the purchaser provided information is used to derive the unique identifier. In one example, the unique identifier is derived solely from the information received, such as from the purchaser. In another example, the unique identifier may be a combination of a user password and a random number.

The receipt generator 200 also includes a token generator 230, which is configured to generate a digital token that is associated with at least one right to an item of digital content. Moreover, the digital token is invariant across one or more versions or formats of the underlying item of digital content. That is, when generating the universal digital token, one or more versions or formats of the item of digital content can be used. The digital token generated is invariant, in that no matter which version is used, the same digital token is generated.

FIG. 3 is a flow diagram 300 illustrating a computer implemented for generating a digital token associated with at least one right to an item of digital content based on a universal digital fingerprint of the item and an identifier, in accordance with one embodiment of the present disclosure. For example, flow diagram 300 is implemented to generate a receipt showing an association between the holder of the receipt and at least one right to an item of digital content. In another embodiment, flow diagram 300 is implemented within a computer system including a processor and memory coupled to the processor and having stored therein instructions that, if executed by the computer system causes the system to execute a method for generating a digital token associated with at least one right to an item of digital content based on a universal digital fingerprint of the item and an identifier. In still another embodiment, instructions for performing a method are stored on a non-transitory computer-readable storage medium having computer-executable instructions for causing a computer system to perform a method for generating a digital token associated with at least one right to an item of digital content based on a universal digital fingerprint of the item and an identifier. The method outlined in flow diagram 300 is implementable by one or more components of the computer system 100, and/or receipt generator 200 of FIGS. 1 and 2, respectively.

At 310, the method includes accessing a universal digital fingerprint associated with an item of content. As previously described, the digital fingerprint is invariant across one or more versions and/or formats (e.g., digital encoding, video resolutions, etc.) of the item of digital content. In one example, the fingerprint generator/receiver 210 is implemented to access the universal digital fingerprint.

For example, the digital fingerprint is generated using any fingerprinting algorithm. In general, a fingerprinting technique decodes, identifies, and extracts characteristics of an item of digital content. Those characteristics are used as or to ultimately derive the digital fingerprint. That is, the characteristics are present and identifiable no matter which version and/or format of the item of digital content is used to produce the digital fingerprint. In one case, the item of digital content is a movie, which includes both video and audio content. That movie may have different versions, each to a different encoding platform (e.g., MPEG2, MPEG3, AVI, etc.) or video resolution (SD, HD, etc.). In one case, using a selected digital video fingerprinting algorithm, the same digital fingerprint is generated no matter which version of the item of digital content (in this case a movie) is used. In another case, using a selected digital audio fingerprinting algorithm, the same digital fingerprint is also generated no matter which version of the item is used.

In one implementation, because the digital fingerprint is invariant, the method accesses a previously generated digital fingerprint that is associated with the item of digital content. In another implementation, accessing the digital fingerprint in the method includes generating the digital fingerprint. That generation includes accessing a version of the item of content, and performing a fingerprinting algorithm (e.g., video or audio fingerprinting algorithm, etc) on the version to generate the digital fingerprint.

At 320, the method includes accessing an identification value. The identification value is used to generate the receipt or digital token. In one case, the identification value is presented for use, such as, by a purchaser of one instance of an item of digital content. In another case, the identification value is generated by the retailer or seller of the instance of the item of digital content, such as, a transaction identifier that is associated with a transaction transferring at least one right to an item of content to a purchaser and/or customer. In still another case, the identification is generated with a combination of information, such as, a customer identifier including information provided by a purchaser of an instance of an item of content, as well as information provided by the seller of the instance of the item digital content. For example, the method includes receiving a customer identifier that is associated with a customer, and combining a transaction identifier and the customer identifier to generate the identification value. In one implementation, the identification generator/receiver 220 is used to access the identification value.

The identification value is used to generate the receipt or digital token. In that manner, the digital token that is generated is associated with the identification value. With that association, the identification value may be used to validate the digital token, as will be described further in relation to FIGS. 4 and 5. For example, the identification value includes a specific account (e.g., a customer account number, a user password, a user device number (e.g., mobile phone number). In embodiments, the identification value comprises an account identifier, a user or customer identifier, and/or device identifier.

At 330, the method includes generating a digital token by cryptographically binding the digital fingerprint and the identification value. For example, the binding operation may include performing a hash algorithm or function, such as, a cryptographic hash function, or a one-way hash function on the combined value of the digital fingerprint and the identification value. The hash algorithm or function takes the data and returns a hash value, such that any change to the original data will also change the hash value. In one embodiment, the hash algorithm or function comprises a one-way hash algorithm or function, so that it may not be reverse engineered. The digital token is invariant across the one or more versions and/or formats of the item of content. For example, the digital token comprises a unique value that is invariant across different encodings (e.g., MPEG2, MPEG4, AVI, QuickTime, etc.) and/or different video resolutions (e.g., SD, HD, 4K, etc.). In one implementation, the token generator 230 is configured to generate the combined value, and also to generate the digital token.

At 340, the method includes associating the digital token with at least one right to the item of digital content. Specifically, the digital token has an association with the underlying digital content, with the identification value, and also their combination. Further, the identification value is also associated with the at least one right. For example, the at least one right may be associated with or identify a transaction involving an item of digital content. The transaction gives the purchaser the at least one right (e.g., right to play) to an instance (e.g., physical copy, streamed copy, right to play once, etc.). As such, because the identification value has an association with the at least one right to the item of digital content, the digital token also has an association with the at least one right because the digital token is based on the identification value.

Figure 4:
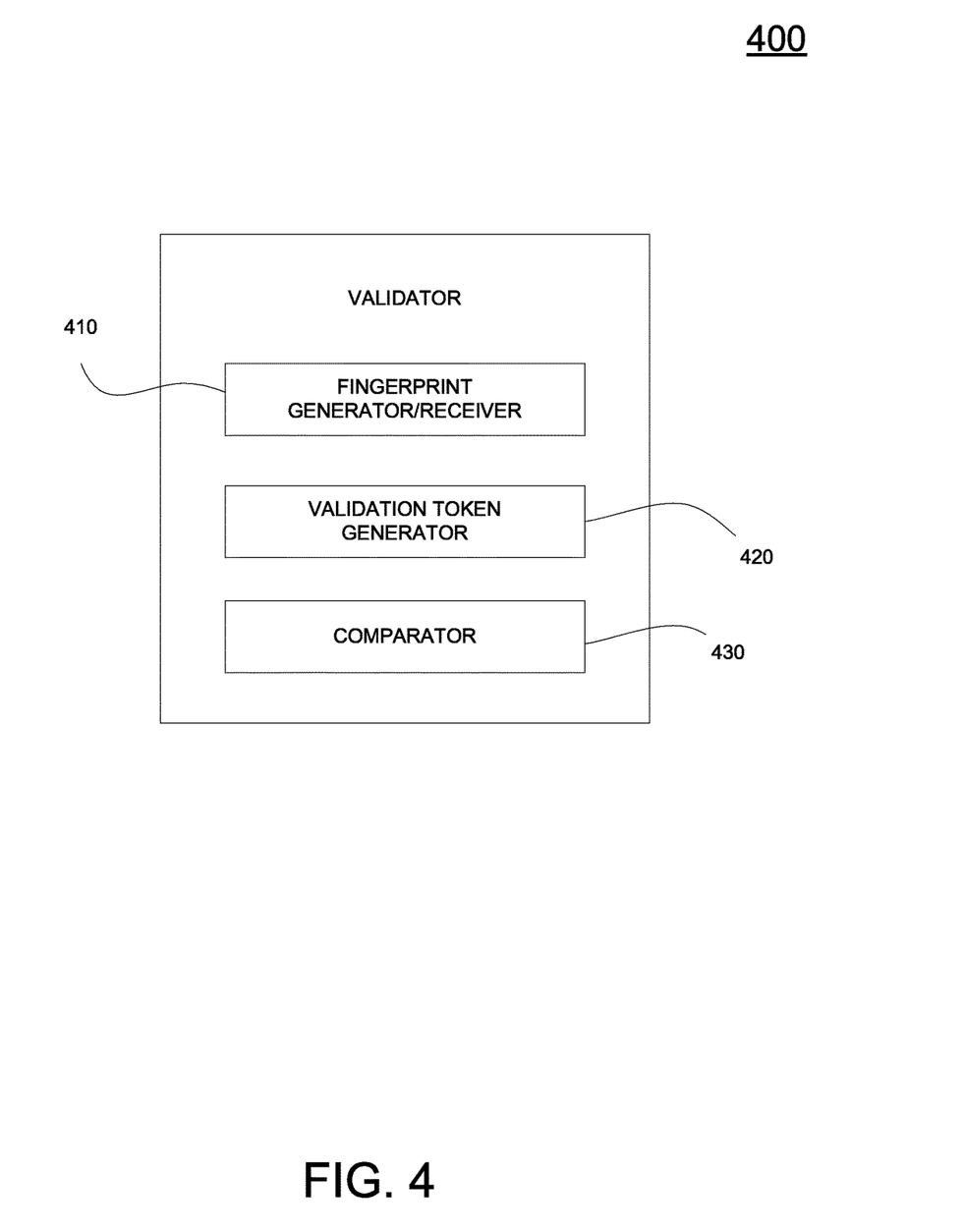
FIG. 4 is a block diagram of a validator configured to validate a digital token that is presented to show at least one right to an item of digital content, wherein the validation is performed without the use of a third party authentication/ verification/validation service, in accordance with one embodiment of the present disclosure.
Figure 5:
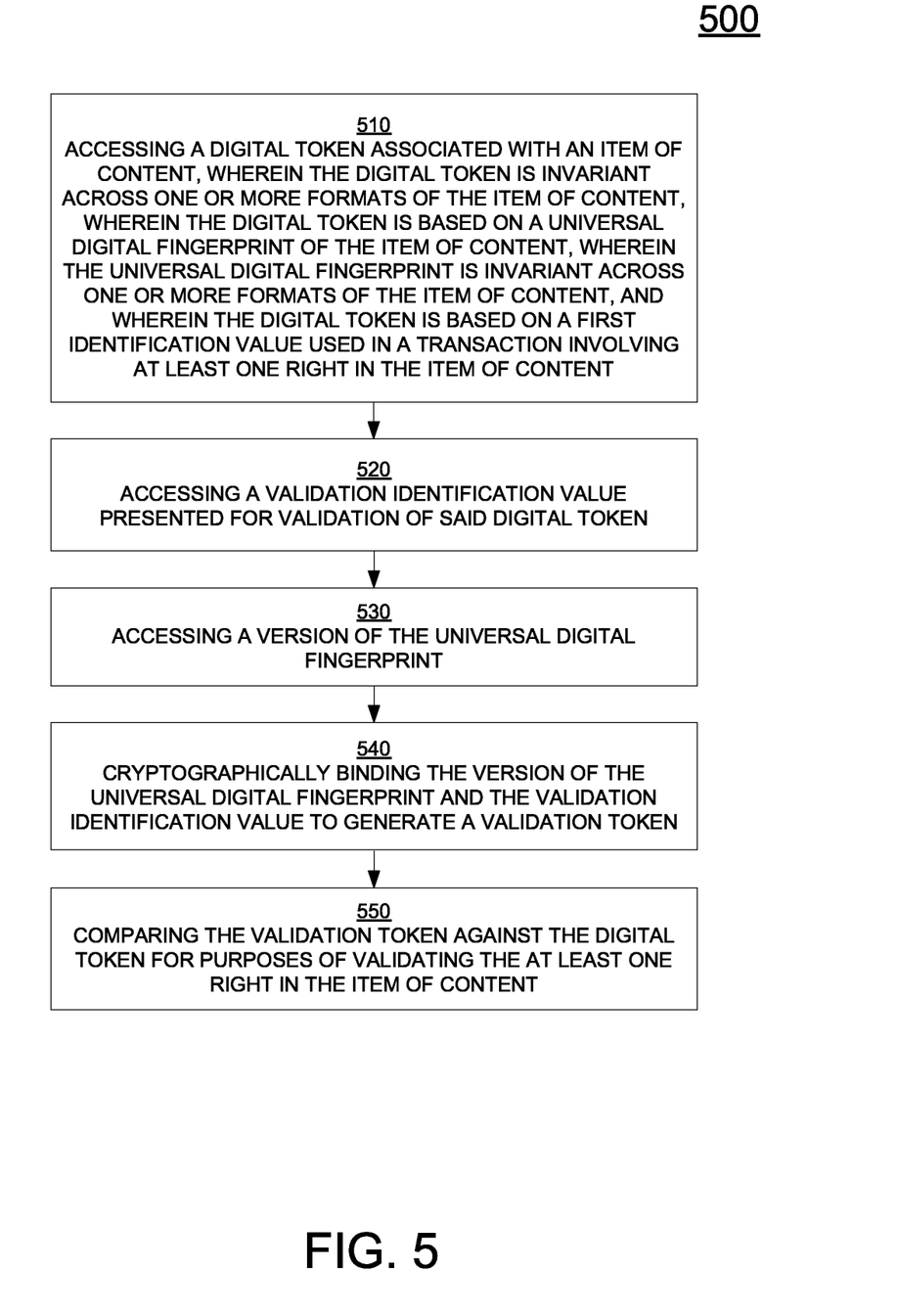
FIG. 5 is a flow diagram illustrating a method for validating a digital token that is presented to show at least one right to an item of digital content, wherein the validation is performed without the use of a third party authentication/verification/validation service, in accordance with one embodiment of the present disclosure.

FIGS. 4 and 5 combined illustrate a system and method for validating a digital token that is presented as proof of at least one right to an item of digital content and/or ownership or possession of that at least one right. For example, the digital token is generated using the methods and systems of FIGS. 2 and 3 in association with a transfer of at least one right to an instance of an item of digital content. More specifically, the digital token is generated based on an identification value, which identifies one or more related elements involved in the transfer of the at least one right, such as, a transaction identifier, a customer account, a customer password, a randomly generated value, etc., as previously described. As a result, the identification value has an association with the digital token, and can be used to validate the digital token at a later time.

In particular, FIG. 4 is a block diagram of a validator 400 configured to validate a digital token that is presented to show at least one right to an item of digital content, wherein the validation is performed without the use of a third party authentication/verification/validation service, in accordance with one embodiment of the present disclosure. The digital token is associated with at least one right to an item of digital content, and is generated to show proof of ownership or possession of that right. As such, validation of the digital token also provides validation or authentication that a presenter of the digital token along with other identifying information owns and/or possesses the at least one right.

As shown in FIG. 4, a fingerprint generator/receiver 410 is configured to access a digital fingerprint that is associated with and based on an item of digital content. The digital fingerprint is universal, in that it is invariant across different versions and/or formats of that item of digital content, as previously described. Because of its invariant qualities, any suitable digital fingerprint that is associated with the item of digital content may be used. For example, a previously generated digital fingerprint may be accessed and used. As another example, a newly generated digital fingerprint may be used, as previously described.

Further, the validator includes a validation token generator 420 that is configured to generate a validation token. In the validation process, the digital token and a validation identification value are used for providing ownership and/or possession of at least one right to an instance of an item of digital content, or at least one right to an item of digital content. That is, both the digital token and the validation identification value are presented for validation of the digital token. In the validation process, the validation identification value that is presented is used to generate a corresponding digital token—the validation token.

The validator 400 also includes a comparator 430 that is configured to compare the validation token against the presented digital token. For a successful validation, if the validation identification value that is presented is identical to the identification value used to generate the original digital token, then the newly generated validation token should also be identical to the original digital token. On the other hand, an unsuccessful validation occurs when the validation identification value that is presented is not identical to the identification value used to generate the digital token, as the validation token will be different from the original digital token.

FIG. 5 is a flow diagram illustrating a computer implemented method for validating a digital token that is presented to show at least one right to an item of digital content, wherein the validation is performed without the use of a third party authentication/verification/validation service, in accordance with one embodiment of the present disclosure. In another embodiment, flow diagram 300 is implemented within a computer system including a processor and memory coupled to the processor and having stored therein instructions that, if executed by the computer system causes the system to execute a method for validating a digital token that is presented to show at least one right to an item of digital content. In still another embodiment, instructions for performing a method are stored on a non-transitory computer-readable storage medium having computer-executable instructions for causing a computer system to perform a method for validating a digital token that is presented to show at least one right to an item of digital content. The method outlined in flow diagram 500 is implementable by one or more components of the computer system 100, and/or validator 400 of FIGS. 1 and 4, respectively.

The process outlined in FIG. 5 is used to validate a digital token that is presented, along with other validation identification information (e.g., a validation identification value), for purposes of providing ownership or possession of at least one right that is associated with an instance of an item of digital content, or more generally at least one right associated with that item of digital content. More specifically, the method includes receiving the digital token, and receiving the validation identification value for purposes of validating the digital token and/or the at least one right to the item of digital content.

At 510, the method includes accessing a digital token that is associated with an item of digital content. For example, the digital token is presented for validation. Moreover, the digital token is based on a universal digital fingerprint of the item of content, wherein the universal digital fingerprint is invariant across one or more formats of said item of content. The digital token is also based on a first identification value that is used in a transaction involving at least one right in the item of content. That is, the digital token and the first identification value form a pair. For example, the transaction is associated with a transfer and/or purchase of ownership and/or possession of the at least one right in the item of content. Further, the digital token is invariant across one or more versions and/or formats of the item of content. As such, given any version or format of the item of content, and proper identification value(s), the digital token should be reproducible, which is tested during the validation process, further described below.

At 520, the method includes accessing a validation identification value that is presented for validation of the digital token. For proper validation, the validation identification value should be identical to the first identification value that was originally used to generate the digital token, since generation of the digital token is based on the first identification value. In one implementation, the validation token generator 420 is configured to generate the validation token.

At 530, the method includes accessing a version of the universal digital fingerprint. As previously described, the digital fingerprint associated with the item of digital content is invariant across one or more versions and/or formats (e.g., digital encoding, video resolutions, etc.) of the item of digital content. In one implementation, the fingerprint generator/receiver 510 is configured to access the previously introduced version of the universal digital fingerprint. In particular, any suitable digital fingerprint that is associated with the item of digital content may be used. For example, a previously generated digital fingerprint may be accessed and used. As another example, a new digital fingerprint may be generated through a fingerprinting algorithm and used, as previously described. That is, a version of the item of content is accessed, and an fingerprinting algorithm (e.g., video fingerprinting algorithm, audio fingerprinting algorithm, etc.) is performed on the version to generate the digital fingerprint.

At 540, the method includes cryptographically binding the version of the universal digital fingerprint and the validation identification value to generate a validation digital token. The validation identification value is typically presented along with the digital token, and more particularly, the validation identification value is used to validate the digital token. For example, the binding operation includes performing a hash algorithm on the combined value comprising the universal digital fingerprint and the validation identification value to generate the validation digital token. In one embodiment, the hash algorithm comprises a one-way hash algorithm. For validation purposes, the hash algorithm is identical to the hash algorithm originally used to generate the original digital token. The validation digital token is also invariant across one or more versions and/or formats of the item of digital content, as long as the same first identification value is also used. In one implementation, the validation token generator 420 is used to generate the validation digital token.

At 550, the method includes comparing the validation token against the digital token for purposes of validating the presented digital token and for validating the associated at least one right in the item of content. In one case, the digital token and the ownership and/or possession of the at least one right are successfully validated when the validation digital token matches the digital token. This occurs when the validation identification value is identical to the first identification value originally used to generate the original digital token. It is assumed that a valid possessor of the digital token should also have knowledge of the first identification value, and present that as the validation identification value. Since the digital fingerprint of the underlying item of digital content is invariant, as long as the validation identification value and the first identification value are identical, the validation token generated using the validation identification value and universal, invariant digital fingerprint should be identical to the original, digital token. In that case, the digital token is successfully validated.

On the other hand, the digital token and the ownership and/or possession of the at least one right are not validated when the validation digital token does not match the digital token. This occurs because the validation identification value is not identical to the first identification value original used to generate the original digital token. That is, the digital token/first identification value pair has been broken.

Figure 6:
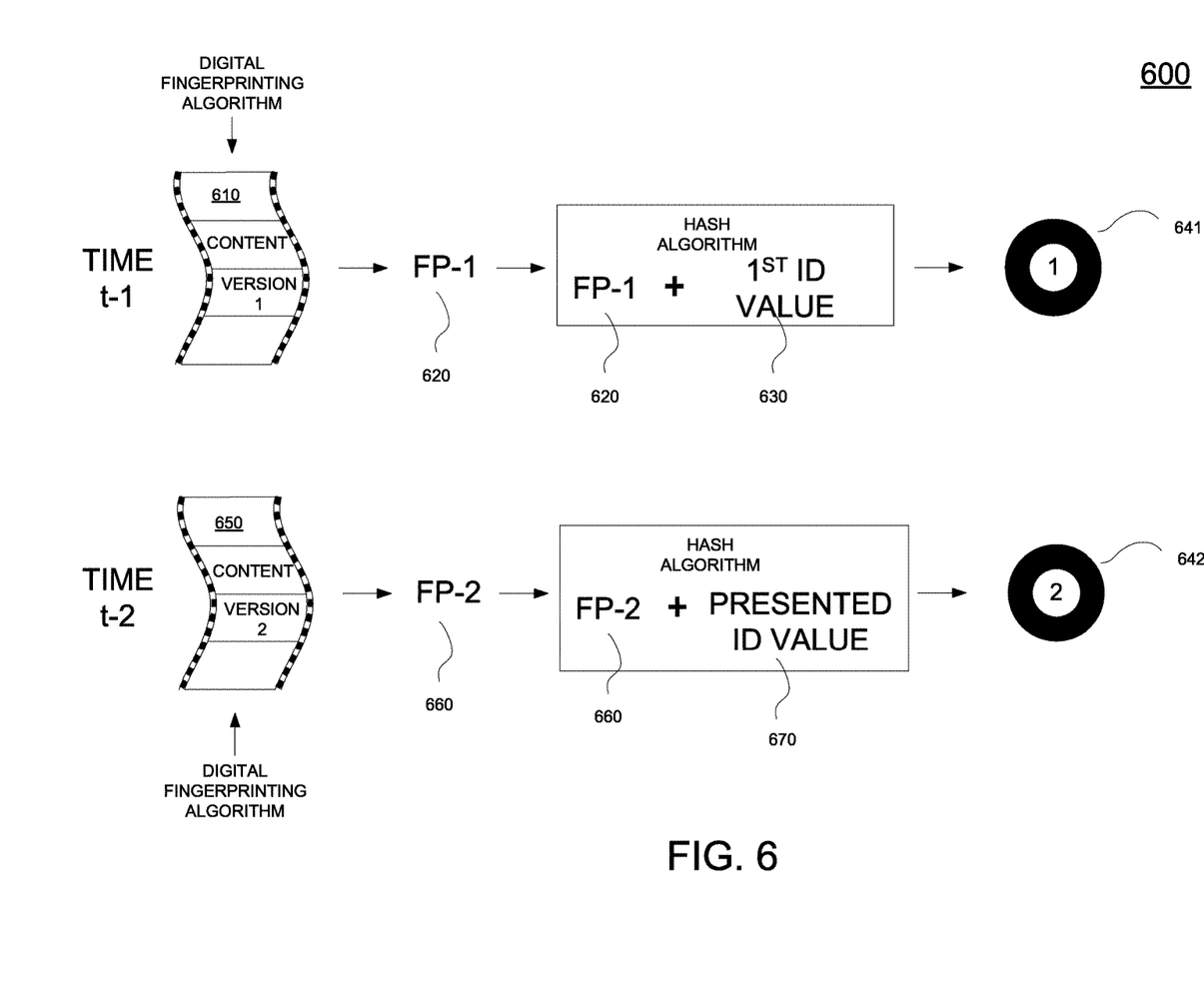
FIG. 6 is a information flow diagram illustrating both the process for generating a digital token that is associated with at least one right to an item of digital content, and a process for validating that digital token without the use of a third party authentication/verification/validation service, in accordance with one embodiment of the present disclosure.

FIG. 6 is an information flow diagram 600 illustrating both a process for generating a digital token that is associated with at least one right to an item of digital content, and a process for validating that digital token without the use of a third party authentication/verification/validation service, in accordance with one embodiment of the present disclosure. Various use cases are illustrated in the information flow diagram 600. For instance, at time t-1, a transaction occurs in which a transfer of ownership or possession is made involving at least one right in association with an item of digital content, or involving at least one right in association with an instance of an item of digital content. For example, the transaction may involve the purchase of a digital copy (DVD) of a movie 610 from a retailer for personal use by a customer or consumer.

FIG. 6 and Equation 1 illustrates the generation of a digital token 641 generated in association with a transaction involving the transfer of at least one right in an item of digital content. Equation 1 illustrates the generation of the digital token, V, wherein the digital token is based on a digital fingerprint (FP) and an identification value (ID). As shown, the digital fingerprint, FP, is generated from a digital fingerprinting algorithm or function, and is represented as FP( ). The digital fingerprint is invariant across different encodings and resolutions. As shown in FIG. 6, at time t-1 a fingerprinting algorithm is performed on version-1 610 of an item of digital content to generate the digital fingerprint FP-1 620.

Using the combination of the digital fingerprint 620 and the first identification value in a cryptographic binding algorithm, H( ), produces a value V as a digital token 641, as shown. The first identification information may include a customer identifier, wherein the customer gives their identifier (e.g., password) to a retailer when the purchase is made (e.g., when purchasing the DVD to the movie), or the retailer generates the identification value (e.g., transaction identifier), or a combination of both. The retailer is able to generate the value V as digital token 641. This value V is also invariant regardless of the version or format of the instance of the item of digital content. That is, a value V, as digital token 641, generated by one source or provider of the rights to the item of digital content will be same value V, or digital token, generated by another source or provider.

$$H(FP(\ ),ID)=V \tag{1}$$

Additionally, the valid holder of the digital fingerprint 620 also holds the first identification value 630 that was used to generate the digital fingerprint 620, or value V. Subsequently, any valid holder of the digital fingerprint 620 can have it validated upon presentation, by also presenting an appropriate validation identification value, that should be identical to the first identification value 630. Specifically, any subsequent generation of a digital token using the first identification value, and the invariant digital fingerprint FP should also produce the same digital token 641.

As such, the validation process is shown at time t-2, where a fingerprinting algorithm is performed on version-2 650 of an item of digital content to generate a digital fingerprint FP-2 660. Because the fingerprinting algorithm is the same used for generating digital fingerprint FP-1 620 at time t-1, FP-1 620 should be identical to FP-2 660. Using the combination of the digital fingerprint FP-2 660 and the validation identification value, presented with the digital token 641, in the same cryptographic binding algorithm, H( ), produces a value V as a digital token 642, as shown. This value V is also invariant regardless of the version or format of the instance of the item of digital content. By comparing the digital token 642 generated at time t-2 against the digital token 641 generated at time t-1, validation of the at least one right (e.g., purchase of a copy of a DVD movie) is performed. Specifically, if the digital token 642 matches the digital token 641, then a successful verification of the digital token 641 and its accompanying at least one right in the item of digital content occurs. This is because the validation identification value is identical to the first identification value originally used to generate the digital token 641. On the other hand, if the digital token 642 does not match the digital token 641, an unsuccessful verification of the digital token occurs.

As an example, the movie production company owning the movie may provide additional offers in relation to the movie contingent on previous ownership or possession of rights to that movie (e.g., earlier purchase of a DVD). For example, instead of a DVD copy, a different and higher performing format may be offered (e.g., Blue-ray, etc.), or merchandise may be created in association with the movie and offered, or replacement copies may be offered.

In another example use case, a customer is flying over the Atlantic Ocean, and wishes to purchase a right to view a movie through a video-on-demand service (e.g., through the airplane) to stream and view the movie. The customer receives a digital token and a first identification value pair in association with the right to stream the movie. However, the customer did not finish watching the movie. At a later time, the customer wishes to finish the movie. The customer connects with the same or different video-on-demand service (e.g., through a hotel), and presents the same digital token and the same first identification value as a validation identification value. In that manner, the customer is able to prove previous rights to the movie (e.g., streaming rights). The video-on-demand service can validate the digital token using the validation identification value, and the underlying digital content, and validate those previous rights. If there are two separate video-on-demand services, no previous relationship need exist between the two services, in one embodiment. At that time, the video-on-demand service may provide several options, including re-streaming the movie at a reduced rate. It is important to note that the second provider need not be the same as the first video-on-demand service provider. It is also important to note that the second provider is able to verify the underlying digital content is the same movie, and to validate the digital token without participation by any third party authentication service.

In another example use case, a customer purchases rights to a movie, such as, purchasing a DVD through a first retailer. At a later time, the customer is flying over the Atlantic Ocean, and wants to purchase a right to view the same movie from a second retailer or service provider. That is, the customer would like to stream the same movie to watch on the airplane. The second retailer may offer to reduce the streaming costs if the customer can prove a previous ownership in the same movie. Through embodiments of the present invention, the customer presents the original digital token with a validation identification value, and the second retailer can use the validation identification value in combination with a universal digital fingerprint to the underlying movie to validate the digital token. No previous relationship need exist between the two retailers. Once successfully validated, the customer may take advantage of the offer. For instance, the second retailer may grant access to the digital content as long as one of a variety of transaction options are satisfied (e.g., pay an extra 50 cents, provide user information, etc.).

Thus, according to embodiments of the present disclosure, systems and methods are described for generating a digital token based on an item of digital content and that is used to validate at least one right to that item, wherein the digital token is generated and validated independent of the formatting of the underlying item of digital content. In particular, the invariant fingerprint allows the resulting digital token (e.g., receipt) to be strongly bound to its underlying media (e.g., item of digital content), and allows at each step for a provider to recomputed the digital fingerprint, for purposes of validating that the underlying media is correct, and that the digital token is correct.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer-implemented method for validating rights to content, the method comprising:
   in a non-originating computer system, receiving a request over a network to obtain an item of content that has been previously obtained, the request including a first digital token invariant across one or more formats of the item of content, the first digital token having been previously generated by an originating computer system by accessing a universal digital fingerprint and an identification value and cryptographically binding the universal digital fingerprint and the identification value, the universal digital fingerprint being associated with the item of content, wherein the first digital token and the identification value form a pair and are associated with a transaction involving at least one right in the item of content;
   in the non-originating computer system, accessing a version of the universal digital fingerprint associated with the item of content;
   in the non-originating computer system, accessing the identification value;
   in the non-originating computer system, generating a second digital token by cryptographically binding the universal digital fingerprint and the identification value, wherein the second digital token is a validation token; and
   in the non-originating computer system, validating the right to the item of content when the first digital token and the second digital token match, wherein the validation is performed without use of a third party validation service,
   wherein the originating and non-originating computer systems access the same universal digital fingerprint for the item of content, and cryptographically bind the universal digital fingerprint and the identification value using the same token algorithm, and the non-originating computer system has no communication with the originating computer system.

2. The method of claim 1 wherein the request includes the identification value, the identification value including a transaction identifier.

3. The method of claim 1 wherein the same token algorithm includes a one-way cryptographic hash algorithm.

4. The method of claim 1 wherein the universal digital fingerprint is invariant across one or more formats of the item of content.

5. The method of claim 1 wherein the originating computer system provides the first digital token to a customer computer system, and does not store the first digital token after the first digital token has been provided.

6. The method of claim 1 wherein the originating computer system provides the identification value to a customer computer system, and does not store the identification value after the identification value has been provided.

7. A non-transitory machine-readable medium having stored thereon sequences of instructions to be executed by a non-originating computer system, the sequences of instructions including a method comprising:
   in the non-originating computer system, receiving a request over a network to obtain an item of content that has been previously obtained, the request including a first digital token invariant across one or more formats of the item of content, the first digital token having been previously generated by an originating computer system by accessing a universal digital fingerprint and an identification value and cryptographically binding the universal digital fingerprint and the identification value, the universal digital fingerprint being associated with the item of content, wherein the first digital token and the identification value form a pair and are associated with a transaction involving at least one right in the item of content;
   in the non-originating computer system, accessing a version of the universal digital fingerprint associated with the item of content;
   in the non-originating computer system, accessing the identification value;
   in the non-originating computer system, generating a second digital token by cryptographically binding the universal digital fingerprint and the identification value, wherein the second digital token is a validation token; and
   in the non-originating computer system, validating the right to the item of content when the first digital token and the second digital token match, wherein the validation is performed without use of a third party validation service,
   wherein the originating and non-originating computer systems access the same universal digital fingerprint for the item of content, and cryptographically bind the universal digital fingerprint and the identification value using the same token algorithm, and the non-originating computer system has no communication with the originating computer system.

8. The method of claim 7 wherein the request includes the identification value, the identification value including a transaction identifier.

9. The method of claim 7 wherein the same token algorithm includes a one-way cryptographic hash algorithm.

10. The method of claim 7 wherein the universal digital fingerprint is invariant across one or more formats of the item of content.

11. The method of claim 7 wherein the originating computer system provides the first digital token to a customer computer system, and does not store the first digital token after the first digital token has been provided.

12. The method of claim 7 wherein the originating computer system provides the identification value to a customer computer system, and does not store the identification value after the identification value has been provided.

* * * * *